United States Patent
Meng et al.

(10) Patent No.: US 12,272,937 B2
(45) Date of Patent: Apr. 8, 2025

(54) CABLE MODULE, GAS-INSULATED DEVICE, AND METHOD FOR MANUFACTURING CABLE MODULE

(71) Applicant: Hitachi Energy Ltd, Zürich (CH)

(72) Inventors: GuoZhu Meng, Fujian (CN); Gang Bai, Fujian (CN); ZhiGuo Zhang, Fujian (CN)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/715,723

(22) PCT Filed: Nov. 30, 2022

(86) PCT No.: PCT/EP2022/083938
§ 371 (c)(1),
(2) Date: Jun. 2, 2024

(87) PCT Pub. No.: WO2023/099613
PCT Pub. Date: Jun. 8, 2023

(65) Prior Publication Data
US 2024/0421580 A1    Dec. 19, 2024

(30) Foreign Application Priority Data
Dec. 3, 2021   (EP) .................... 21212131

(51) Int. Cl.
*H02G 15/02*   (2006.01)
*H02G 1/14*    (2006.01)
*H02G 15/00*   (2006.01)

(52) U.S. Cl.
CPC ........... *H02G 15/003* (2013.01); *H02G 15/02* (2013.01); *H02G 1/14* (2013.01)

(58) Field of Classification Search
CPC ............. H02B 13/075; H02B 13/0358; H02B 13/0356; H02B 13/0352; H01R 31/06; H02G 15/18; H02G 15/184
(Continued)

(56) References Cited

U.S. PATENT DOCUMENTS 4,237,333 A * 12/1980 Classon ................. H02G 15/22
174/18
2017/0117641 A1   4/2017 Probst et al.

FOREIGN PATENT DOCUMENTS

CN         105846336 A      8/2016
DE       202014003281 U1    6/2014
(Continued)

OTHER PUBLICATIONS

Extended European Search Report dated May 4, 2022 for European Patent Application No. 21212131.3, 10 pages.
(Continued)

*Primary Examiner* — Timothy J Thompson
*Assistant Examiner* — Michael F McAllister
(74) *Attorney, Agent, or Firm* — Sage Patent Group (57) ABSTRACT

The present disclosure relates to a cable module with a detachable fracture feature, a gas-insulated device including the cable module, and a method for manufacturing the cable module. The cable module for a high voltage gas-insulated device with a detachable electric connection includes: an enclosure provided with a first opening and a second opening; an insulator provided with a conductive insert and fixed to a first flange of the enclosure around the first opening; a cable terminal connector passing through a wall of the enclosure and including a first end positioned inside the enclosure and a second end positioned outside the enclosure and configured to be connected to an external cable; a (Continued)

plurality of conductors connecting the conductive insert and the first end of the of the cable terminal connector.

13 Claims, 7 Drawing Sheets

(58) Field of Classification Search
USPC .................................................... 174/17 GF
See application file for complete search history.

(56) References Cited

FOREIGN PATENT DOCUMENTS

| | | |
|---|---|---|
| EP | 3276763 A1 | 1/2018 |
| JP | S59155811 U | 10/1984 |
| JP | H05184051 A | 7/1993 |
| JP | H08228410 A | 9/1996 |
| JP | 2012249366 A | 12/2012 |
| WO | 2016000931 A1 | 1/2016 |

OTHER PUBLICATIONS

International Search Report and Written Opinion of the International Searching Authority, PCT/EP2022/083938, mailed Feb. 24, 2023, 15 pages.
Japanese Office Action and English Translation, Japanese Patent Application No. 2024-532830, mailed Jan. 7, 2025, 6 pages.

\* cited by examiner

Fig. 1

Prior Art

CABLE MODULE, GAS-INSULATED DEVICE, AND METHOD FOR MANUFACTURING CABLE MODULE

CROSS REFERENCE TO RELATED APPLICATIONS

This application is a 35 U.S.C. § 371 national stage application of PCT International Application No. PCT/EP2022/083938 filed on Nov. 30, 2022, which in turn claims foreign priority to European Patent Application No. 21212131.3, filed on Dec. 3, 2021, the disclosures and content of which are incorporated by reference herein in their entirety.

TECHNICAL FIELD

The present disclosure relates to the technical field of high-voltage power transmission. Specifically, the present disclosure relates to a cable module with a detachable electric connection, a gas-insulated device comprising the cable module, and a method for manufacturing the cable module.

BACKGROUND

Gas-insulated devices, such as Gas-Insulated Switchgear (GIS) and Gas-Insulated Transmission Lines (GIL), are widely used in the field of high-voltage power transmission technology. More specifically, Gas-insulated switchgear (GIS) may be considered as a kind of compact metal-encapsulated switchgear consisting of a plurality of high-voltage functional modules such as a cable module, a disconnector module, a circuit-breaker module, etc. Among these functional modules, the cable module (also called "cable terminal module") may be considered as a common area where an external cable (also called "client cable") with a corresponding cable terminal connector interface with other functional modules of the GIS.

Currently, a detachable electric connection is required in the cable module to allow the external cable to be temporarily electrically isolated from the GIS, such that the functional integrity of the GIS itself may be independently verified on site for clients after assembly of the cable module. However, a cable module with a detachable electric connection is usually very complex and difficult to implement, especially because many supplementary components are required, and the size of the cable module is increased.

Figure 1:
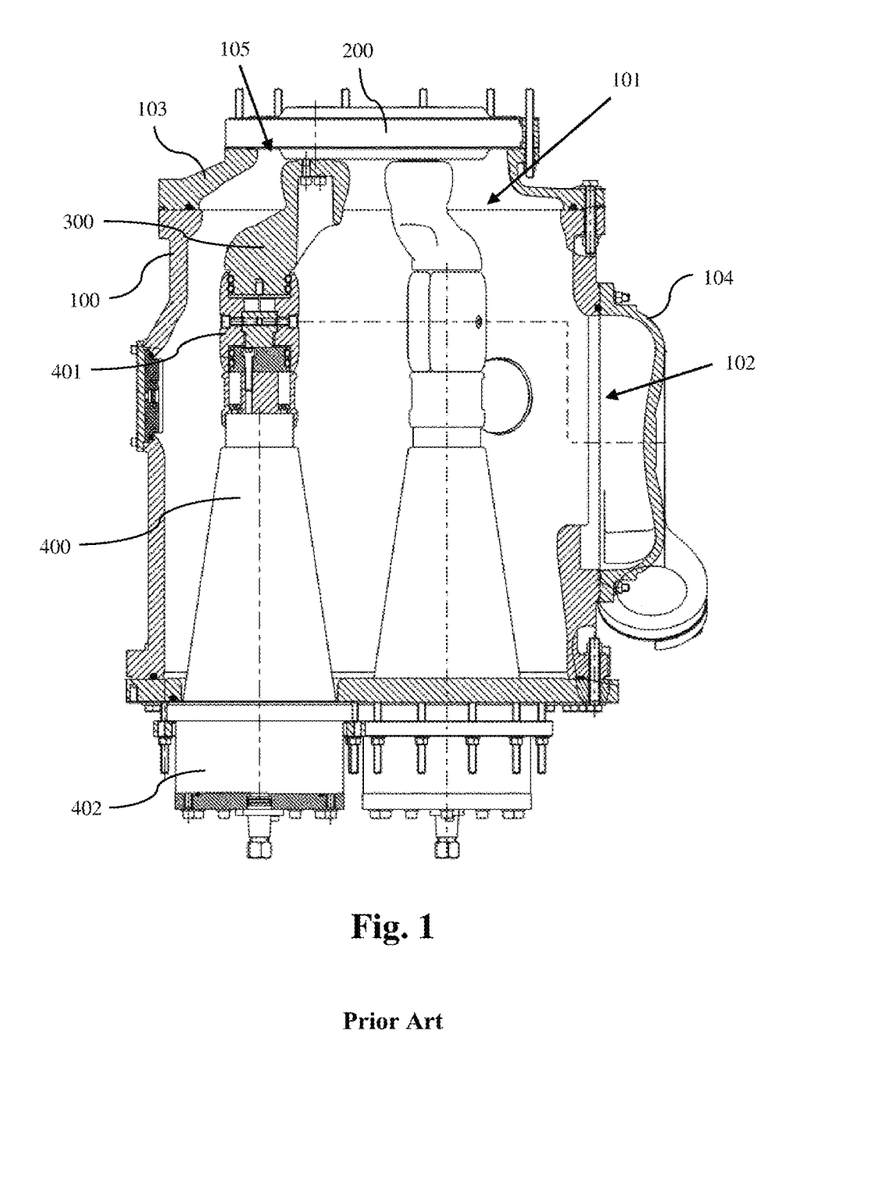
FIG. 1 is a schematic cross-sectional view of a cable module with a detachable electric connection in the prior art.
Figure 2:
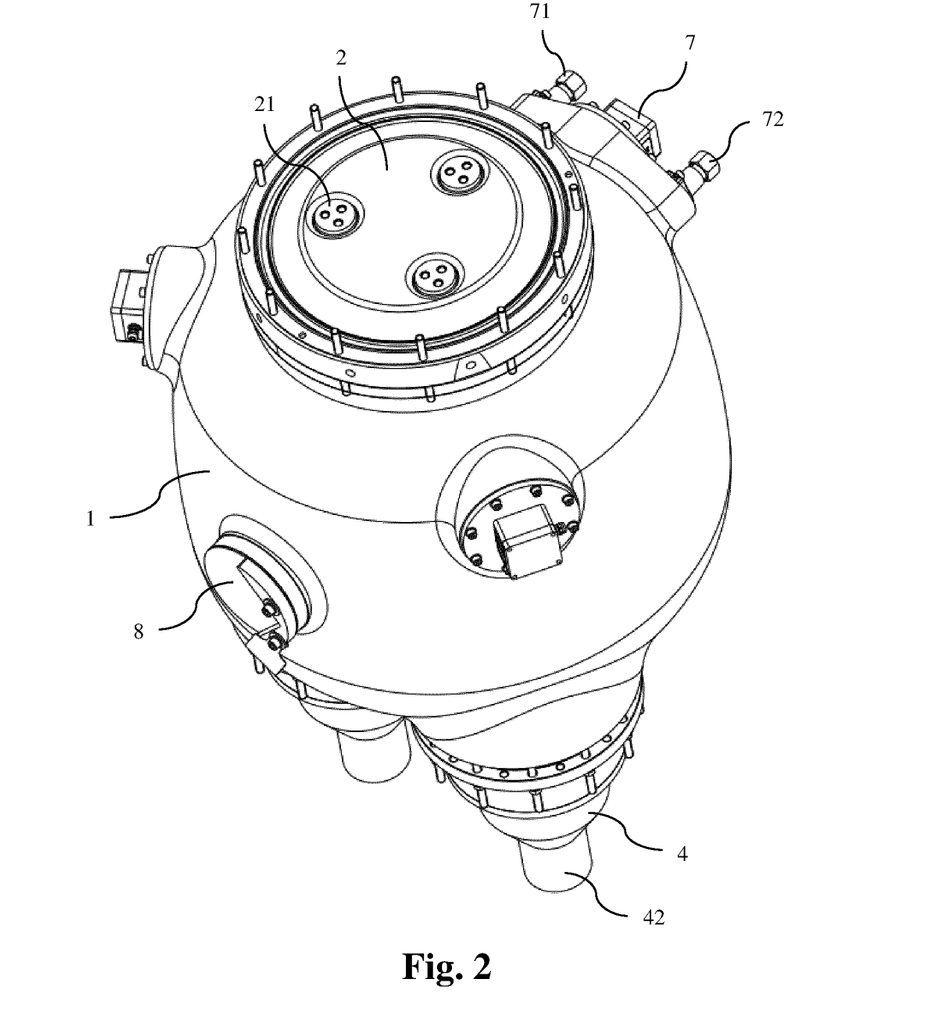
FIG. 2. is a schematic perspective view of an embodiment of a cable module with a detachable electric connection according to the present disclosure.
Figure 3:
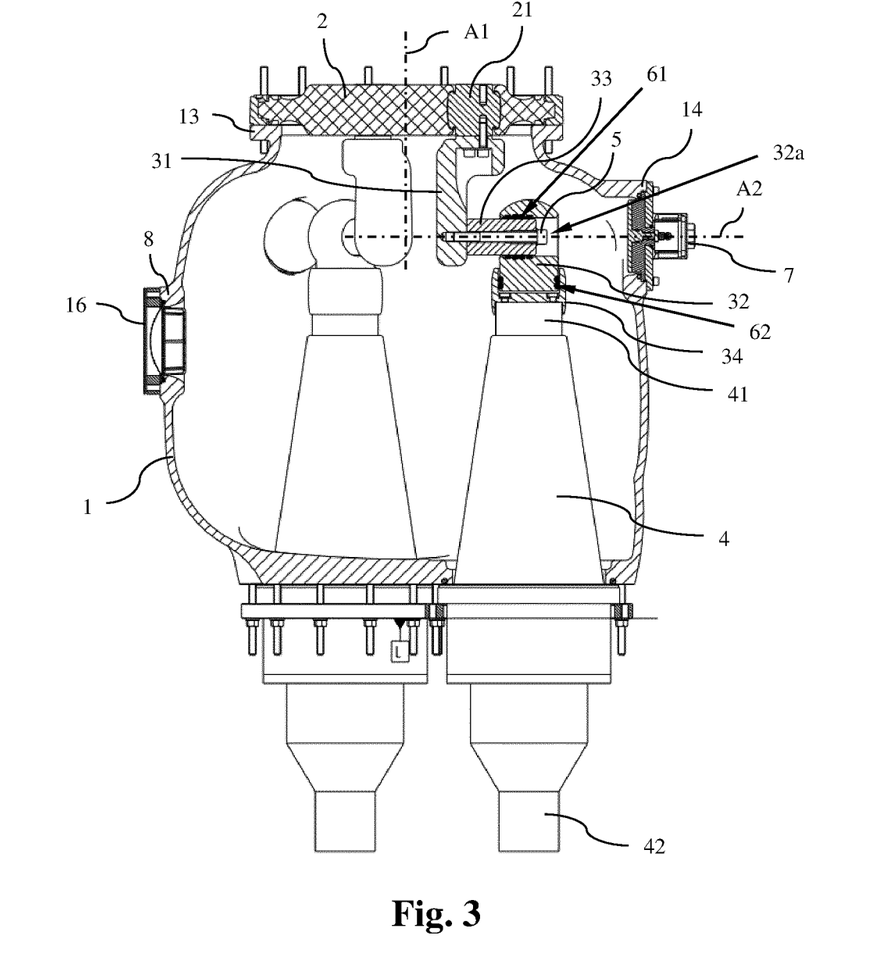
FIG. 3 is a schematic cross-sectional view of the cable module shown in FIG. 2, wherein the detachable electric connection of the cable module is in an assembled state.
Figure 4:
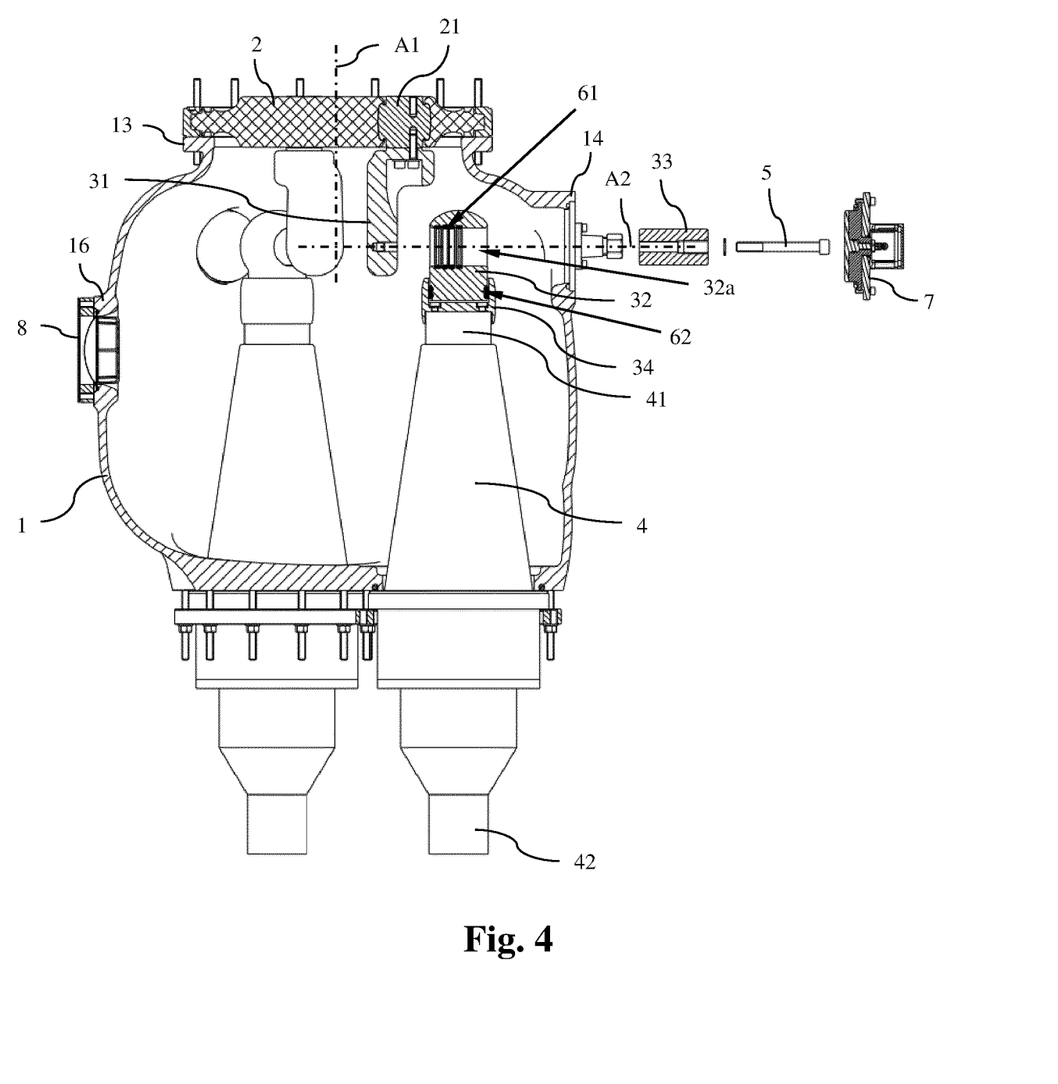
FIG. 4 is a schematic cross-sectional view of the cable module shown in FIG. 2, wherein the detachable electric connection of the cable module is in an disassembled state.
Figure 5:
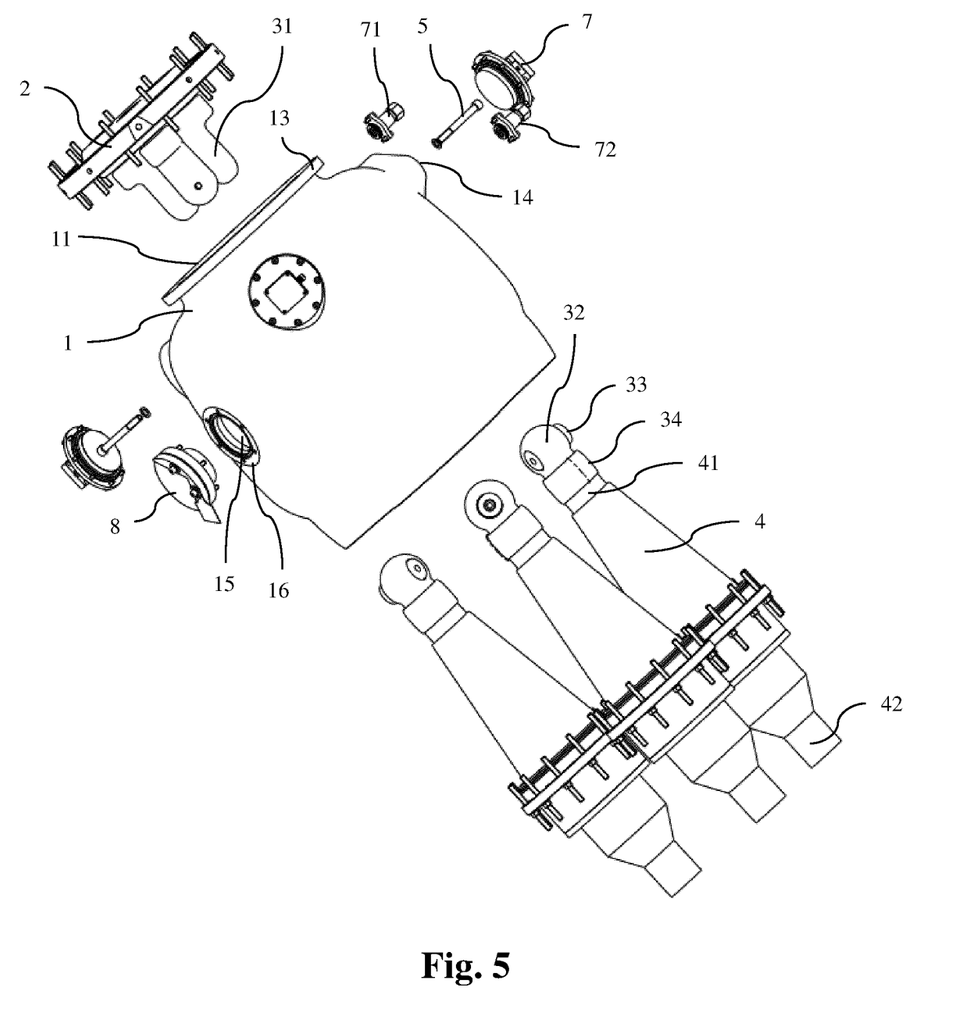
FIG. 5 is a schematic exploded perspective view of the cable module shown in FIG. 2.
Figure 6:
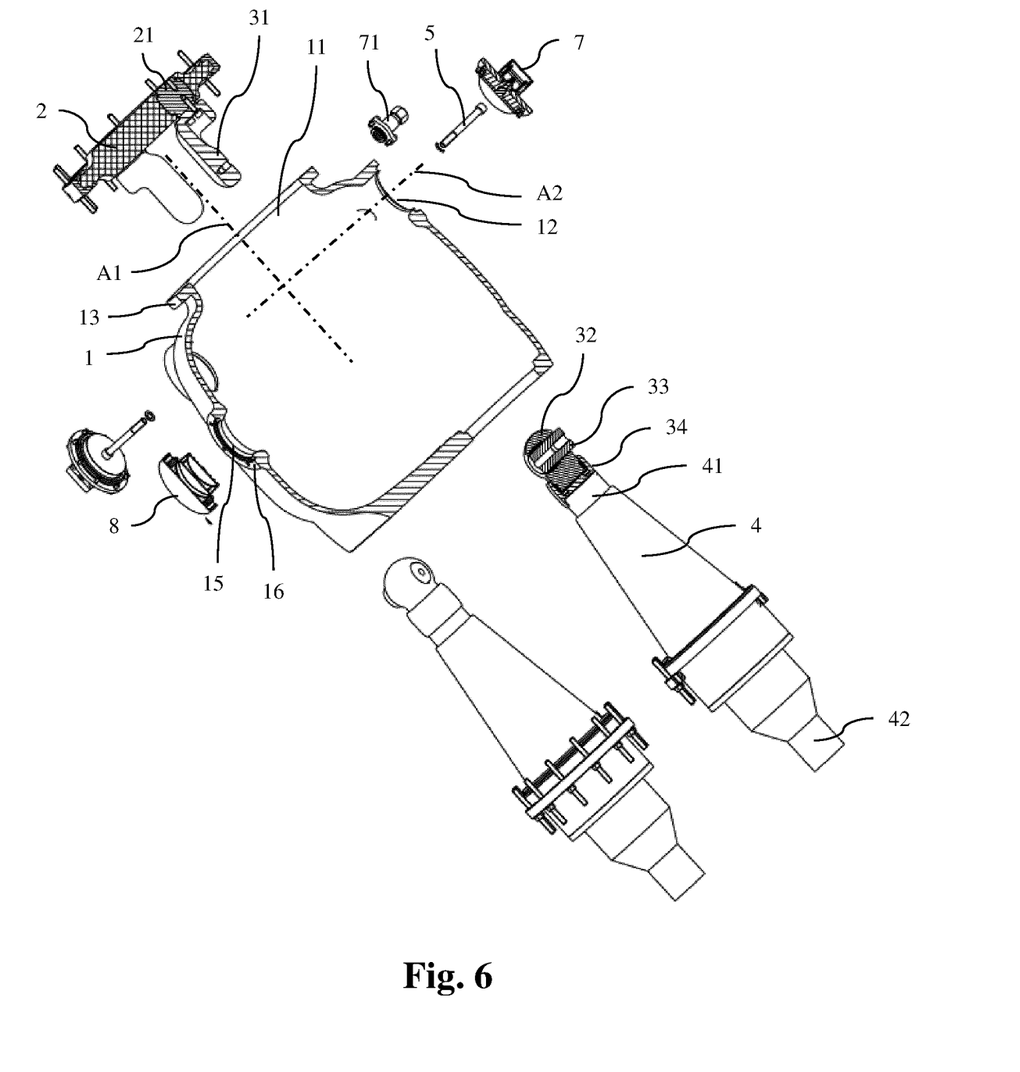
FIG. 6 is a schematic exploded cross-sectional view of the cable module shown in FIG. 2.

For example, FIG. 1 is a schematic cross-sectional view of a cable module with a detachable electric connection in the prior art. As shown in FIG. 1, the cable module comprises: an enclosure 100 with a first opening 101 and a second opening 102; an insulator 200 and a twist conductor 300 electrically connected to a conductive insert arranged in the insulator 200, the assembly of the insulator 200 with the twist conductor 300 being fixed to the enclosure 100 by means of an adapter 103 mounted to the flange of the enclosure 100 around the first opening 101; a cover 104 mounted to the flange of enclosure 100 around the second opening 102; and a cable terminal connector 400 passing through a wall of the enclosure 100 into the interior of the enclosure 100, the first end 401 of which is detachably and electrically connected to the twist conductor 300 inside the enclosure 100 to form a detachable fracture structure, and the second end 402 of which is adapted to be connected to an external cable outside the enclosure 100.

The disadvantages of the above-mentioned technical solution in the prior art lie in that such cable module has high material and labor costs due to the number of components and complex structure, and the detachable fracture structure is difficult to be assembled or disassembled on site. More specifically, when it is necessary to separate the twist conductor 300 from the cable terminal connector 400, it is required to remove the cover 104 from the enclosure 100 to allow a tool to be inserted into the enclosure 100 through the second opening 102 for implementing the disassembling operation. However, the central axis of the second opening 102 is not aligned with the connection interface between the twist conductor 300 and the first end 401 of the cable terminal connector 400, further, the twist conductor 300 and the cable terminal connector 400 are connected or separated along a direction perpendicular to the direction of inserting the tool, all of which enhance the difficulty for disassembly and assembly of the detachable fracture structure on site.

In addition, due to the size of the twist conductor 300, it can be seen that the outer contour of the assembly of the insulator 200 with the twist conductor 300 exceeds the area delimited by the contour of the flange hole 105 of the adapter 103 for fixing the insulator 200, thus such adapter 103 has to be used such that the insulator 200, the twist conductor 300 and such adapter 103 are firstly assembled with each other before mounted to the enclosure 100. Thus, since the adapter 103 is a supplementary component independent of the enclosure 100 rather than integrally formed with the enclosure 100, not only the number of components is increased, but also the labor cost is increased.

SUMMARY

In view of the above, the present disclosure aims to provide a cable module with a detachable electric connection that allows fast, safe and convenient disassembly and assembly of its detachable fracture structure, thereby significantly reducing operation time and labor cost.

To this end, a first aspect of the present disclosure provides a cable module with a detachable electric connection, comprising an enclosure provided with a first opening and a second opening; an insulator provided with a conductive insert and fixed to a first flange of the enclosure around the first opening; a cable terminal connector passing through a wall of the enclosure and comprising a first end positioned inside the enclosure and a second end positioned outside the enclosure and configured to be connected to an external cable; and a plurality of conductors, comprising a first conductor electrically connected to the conductive insert, a second conductor electrically connected to the first end of the cable terminal connector, and a third conductor detachably and electrically connecting the first conductor to the second conductor, wherein the third conductor is configured to be movable relative to the enclosure substantially along a central axis of the second opening to be fixedly connected to or separated from the first conductor.

Thus, since the movable direction of the third conductor is substantially consistent with the moving direction of the tool inserted through the second opening, both the disassembly and assembly operations of the detachable fracture structure are very convenient, thereby greatly saves operation time and labor cost on site.

According to a preferred embodiment of the present disclosure, the third conductor is detachably connected to the first conductor through a bolt, and a central axis of the bolt coincides with the central axis of the second opening.

According to a preferred embodiment of the present disclosure, the third conductor is configured to be movable relative to the second conductor along the central axis of the second opening and is electrically connected to the fourth conductor through a first electrical contact embedded in the second conductor.

According to a preferred embodiment of the present disclosure, the second conductor is provided with a passage penetrating through the entire second conductor along the central axis of the second opening, and the third conductor is configured to be movable in the passage in which the first electrical contact is embedded.

According to a preferred embodiment of the present disclosure, the cable module further comprises a fourth conductor fixedly connected to the first end of the cable terminal connector, and the second conductor is configured to be movable relative to the fourth conductor along a direction perpendicular to the central axis of the second opening and is electrically connected to the second conductor through a second electrical contact embedded in the fourth conductor.

According to a preferred embodiment of the present disclosure, a central axis of the first opening is perpendicular to the central axis of the second opening.

According to a preferred embodiment of the present disclosure, the outer contour of the first conductor does not exceed an area delimited by the contour of the first opening on a cross section perpendicular to the central axis of the first opening.

According to a preferred embodiment of the present disclosure, the cable module further comprises a first cover integrated with a high-voltage detection sensor and fixed to a second flange of the enclosure around the second opening.

According to a preferred embodiment of the present disclosure, the enclosure is further provided with a third opening, and the cable module further comprises a second cover integrated with an explosion-proof membrane and fixed to a third flange of the enclosure around the third opening.

A second aspect of the present disclosure provides a gas-insulated device, such as GIS or GIL, comprising the cable module with a detachable electric connection according to the first aspect of the present disclosure.

A third aspect of the present disclosure provides a method for manufacturing a cable with a detachable electric connection, comprising: providing an enclosure having a first opening and a second opening; providing an insulator having a conductive insert; providing a first conductor electrically connected to the conductive insert, and fixing the assembly of the insulator with the first conductor to a first flange of the enclosure around the first opening; providing a cable terminal connector having a first end and a second end; providing a second conductor electrically connected to the first end of the cable terminal connector, and passing the assembly of the cable terminal connector with the second conductor through a wall of the enclosure such that the first end is positioned inside the enclosure and the second end is positioned outside the enclosure to be connected to an external cable; and providing a third conductor detachably and electrically connecting the first conductor to the second conductor, wherein the third conductor is configured to be movable relative to the enclosure substantially along a central axis of the second opening to be fixedly connected to or separated from the first conductor.

According to a preferred embodiment of the present disclosure, the connection or separation of the first conductor with the third conductor is implemented by inserting a tool through the second opening into the enclosure along the central axis of the second opening.

The cable module with a detachable electric connection according to the present disclosure has a relatively simple structure that is easy to manufacture, and has a low material cost, thus can be widely used in various types of gas-insulated device.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise.

BRIEF DESCRIPTION OF THE DRAWINGS

Other features and advantages of the present disclosure will be better understood through the following preferred embodiment described in detail with reference to the accompanying drawings, in which a same reference numeral indicates a same or similar component.

It should be noted that the drawings not only are used for the explanation and description of the present disclosure, but also are helpful for the definition of the present disclosure when necessary.

DETAILED DESCRIPTION

The implementation and usage of the embodiment are discussed in detail below. However, it should be understood that the specific embodiment discussed are merely intended to illustrate specific ways of implementing and using the present disclosure, and are not intended to limit the protection scope of the present disclosure.

It should be noted that in the description, a "cable module" refers to a kind of high-voltage functional module constituting a part of a gas-insulated device, such as Gas-Insulated Switchgear (GIS) and Gas-Insulated Transmission Lines (GIL), and considered as a common area where an external cable interfaces with other functional modules of the gas-insulated device.

Further, it should be noted that the cable module shown in figures is a three-phase cable module constituting a part of a three-phase gas-insulated device. That is to say, the cable module according to the illustrated embodiment comprises three cable terminal connectors evenly distributed along a circumferential direction and configured to be respectively connected to three conductive inserts arranged in an insulator and to three external cables. Thus, the detachable electric connection of the cable module described below may be applied to a detachable electrical connection between any one of the three cable terminal connectors and the corresponding conductive insert.

In the description, a technical term indicating a directional relationship should not be understood as a kind of absolute concept. For example, the terms "be parallel to", "be perpendicular to", "coincide with" and "along (a direction)" should be understood as "be substantially parallel to", "be substantially perpendicular to", "substantially coincide with" and "substantially along (a direction)", respectively.

FIGS. 2-6 show a preferred embodiment of a cable module with a detachable electric connection according to the present disclosure. As shown in the figures, the cable module according to the present disclosure mainly comprises an enclosure 1, an insulator 2, a cable terminal connector 4, and a plurality of conductors 31, 32, 33.

The enclosure 1 has a substantially cylindrical shape, and is provided with a first opening 11 for mounting the insulator 2 and a second opening 12 used as a tool hole. Preferably, according to the illustrated embodiment, a central axis A1 of the first opening 11 is perpendicular to a central axis A2 of the second opening 12. The insulator 2 is a basin insulator provided with a conductive insert 21 and arranged to be fixed to a first flange 13 of the enclosure 1 around the first opening 11. The cable terminal connector 4 is arranged to pass through a wall of the enclosure 1 opposite to the first opening 11, and comprises a first end 41 positioned inside the enclosure 1 and a second end 42 positioned outside the enclosure 1 and configured to be connected to an external cable.

The first conductor 31 is arranged to be fixed to the conductive insert 21, for example through a bolt, so as to be electrically connected to the conductive insert 21 to form a first assembly. Preferably, according to the illustrated embodiment, the outer contour of the first conductor 31 does not exceed an area delimited by the contour of the first opening 11 on a cross section perpendicular to the central axis A1 of the first opening 11, that is, on a cross section parallel to the central axis A2 of the second opening 12. Thus, the first assembly may be directly fixed to the first flange 13 of the enclosure 1 through the insulator 2 without using a supplementary adapter.

The second conductor 32 is arranged to be electrically connected to the first end 41 of the cable terminal connector 4 to form a second assembly, and is provided with a passage 32a penetrating through the entire second conductor 32 along the central axis A2 of the second opening 12. Preferably, according to the illustrated embodiment, the second assembly further comprises a fourth conductor 34 fixedly connected to the first end 41 of the cable terminal connector 4, and into which one end of the second conductor 32 is inserted. In this case, the second conductor 32 is arranged to be movable relative to the fourth conductor 34 along a direction perpendicular to the central axis A2 of the second opening 12, and is electrically connected to the fourth conductor 34 through an electrical contact 62, such as a coil spring, arranged around the end of the second conductor 32 and embedded in the fourth conductor 34.

The third conductor 33 is arranged to be inserted into the passage 32a of the second conductor 32 and is electrically connected to the second conductor 32 through an electrical contact 61, such as a coil spring, embedded in the passage 32a. The third conductor 33 is movable relative to the second conductor 32 (thus relative to the enclosure 1) in the passage 32a substantially along the central axis A2 of the second opening 12 to be fixedly connected to or separated from the first conductor 31, thereby achieving a detachable electrical connection between the first conductor 31 and the second conductor 32, that is, the detachable electrical connection between the first assembly and the second assembly.

It is conceivable that the moveable direction of the third conductor 33 (i.e., the direction of extension of the passage 32a) does not have to be absolutely along the central axis A2 of the second opening 12. In fact, the movable direction of the third conductor 33 may be parallel to but slightly spaced from the central axis A2 of the second opening 12, or may be slightly inclined with respect to the central axis A2 of the second opening 12, as long as the third conductor 33 is capable of passing through the second opening 12.

Preferably, according to the illustrated embodiment, the third conductor 33 is detachably connected to the first conductor 31 through a bolt 5 passing through the third conductor 33 and screwed into the first conductor 31, and a central axis of the bolt 5 coincides with the central axis A2 of the second opening 12. That is to say, when it is required to electrically connect the first conductor 31 to the second conductor 32, a tool, such as a screwing tool, is inserted through the second opening 12 into the enclosure 1 along the central axis A2 of the second opening 12, so as to securely and fixedly connect the third conductor 33 to the first conductor 31 by tightening the bolt 5. Similarly, when it is required to electrically insulate the first conductor 31 from the second conductor 32, a tool, such as a screwing tool, is inserted through the second opening 12 into the enclosure 1 along the central axis A2 of the second opening 12, so as to separate the third conductor 33 from the first conductor 31 by loosening the bolt 5.

During assembly of the cable module, firstly, the first assembly formed by the insulator 2 and the first conductor 31 is directly fixed to the first flange 13 of the enclosure 1 around the first opening 11, such that the first conductor 31 is positioned at a predetermined position inside the enclosure 1; then, the second assembly formed by the cable terminal connector 4, the second conductor 32 and the possible fourth conductor 34 is passed through the wall of the enclosure 1 opposite to the first opening 11, such that the first end 41 of the cable terminal connector 4, the second conductor 32 and the fourth conductor 34 are positioned at predetermined positions inside the enclosure 1; finally, the third conductor 33 is arranged by a tool passing through the second opening 12 so as to detachably and electrically connect the first assembly to the second assembly. It can be understood that the third conductor 33 may be pre-inserted into the passage 32a of the second conductor 32 before the second assembly is inserted into the enclosure 1, or the third conductor 33 may be inserted into the passage 32a of the second conductor 32 through the second opening 12 by a tool after the second assembly is inserted into the enclosure 1.

It can be seen that the cable module with a detachable electric connection according to the present disclosure has a relatively simple structure that is easy to manufacture, and has a low material cost. Further, the cable module allows fast, safe and convenient disassembly and assembly of its detachable fracture structure, thereby greatly reducing operation time and labor cost on site.

In addition, due to the movability of the third conductor 33 relative to the second conductor 32 along the direction of the central axis A2 of the second opening 12, and the movability of the second conductor 32 relative to the possible fourth conductor 34 along a direction perpendicular to the central axis A2 of the second opening 12, such detachable fracture structure may compensate for positional deviations caused by manufacturing tolerances or thermal expansion/contraction during operation in both of the two directions, thereby effectively avoiding damage of these components and prolonging service life of the cable module.

Further, according to the illustrated embodiment, the cable module further comprises a first cover 7 integrated with a high-voltage detection sensor and fixed to a second flange 14 of the enclosure 1 around the second opening 12. Alternatively, the first cover 7 may further be integrated with an inflation port 71 and a density meter 72. In a variant, the first cover 7 may only be used to cover the second opening 12 without integrating any other functions.

Further, according to the illustrated embodiment, the enclosure 1 is further provided with a third opening 15, and the cable module further comprises a second cover 8 integrated with an explosion-proof membrane and fixed to a third flange 16 of the enclosure 1 around the third opening 15. Alternatively, the second cover 8 may further be integrated with a moisture absorber.

Figure 7:
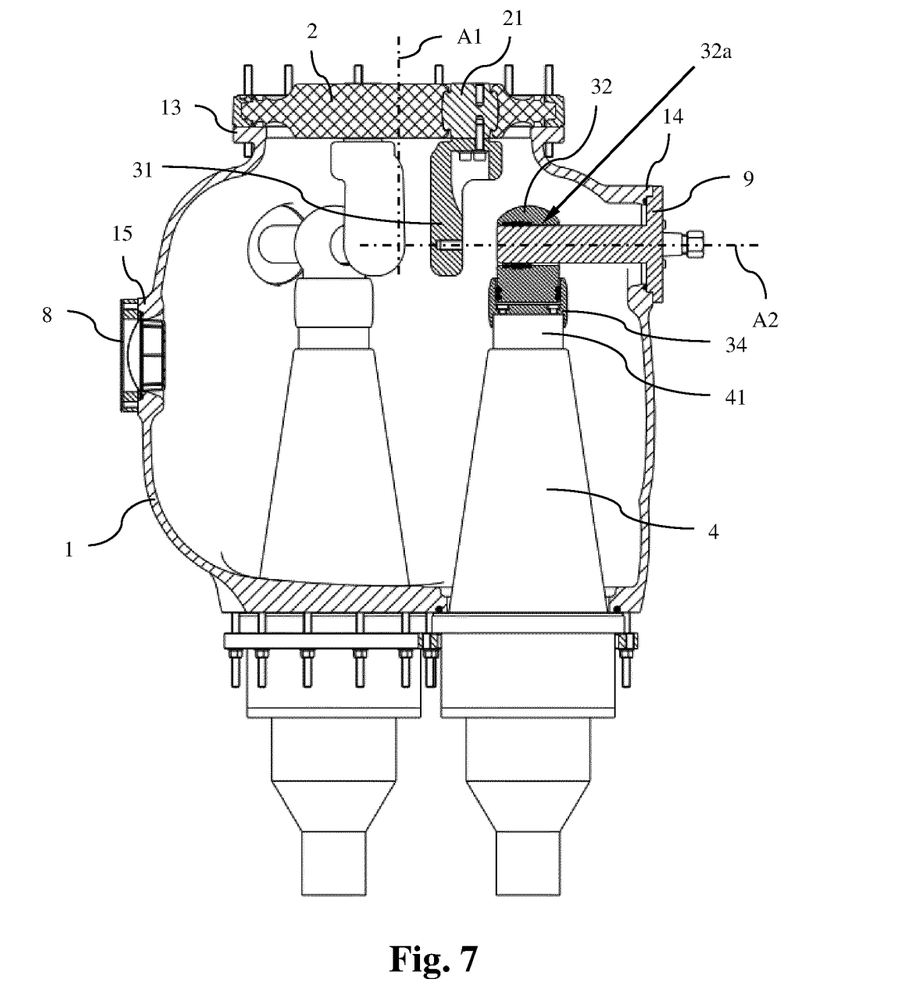
FIG. 7 is a schematic cross-sectional view of a grounding structure of the cable module shown in FIG. 2.

FIG. 7 is a schematic cross-sectional view of a grounding structure of the cable module. As shown in FIG. 7, when the second opening 12 is opened and the third conductor 33 is taken out, the grounding of cable side may be conveniently achieved by a substantially T-shaped metal piece 9 partially inserted into the passage 32a of the second conductor 32 and fixed to the second flange 14 of the enclosure 1.

The technical content and features of the present disclosure have been disclosed above. However, it is conceivable that, under the creative ideas of the present disclosure, those skilled in the art can make various changes and improvements to the concepts disclosed above, but these changes and improvements all belong to the protection scope of the present disclosure. The description of the above embodiment is exemplary rather than restrictive, and the protection scope of the present disclosure is defined by the appended claims.

The invention claimed is:

1. A cable module for a high voltage gas-insulated device with a detachable electric connection, comprising:
    an enclosure provided with a first opening and a second opening;
    an insulator provided with a conductive insert and fixed to a first flange of the enclosure around the first opening;
    a cable terminal connector passing through a wall of the enclosure and comprising a first end positioned inside the enclosure and a second end positioned outside the enclosure and configured to be connected to an external cable;
    a plurality of conductors, comprising a first conductor electrically connected to the conductive insert, a second conductor electrically connected to the first end of the cable terminal connector, and a third conductor detachably and electrically connecting the first conductor to the second conductor; and
    a fourth conductor fixedly connected to the first end of the cable terminal connector; wherein
    the third conductor is configured to be movable relative to the enclosure substantially along a central axis of the second opening to be fixedly connected to or separated from the first conductor, and
    the second conductor is configured to be movable relative to the fourth conductor along a direction perpendicular to the central axis of the second opening and is electrically connected to the fourth conductor through a second electrical contact embedded in the fourth conductor.

2. The cable module according to claim 1, wherein the third conductor is detachably connected to the first conductor through a bolt, and wherein a central axis of the bolt coincides with the central axis of the second opening.

3. The cable module according to claim 1, wherein the third conductor is configured to be movable relative to the second conductor along the central axis of the second opening and is electrically connected to the second conductor through a first electrical contact embedded in the second conductor.

4. The cable module according to claim 3, wherein the second conductor is provided with a passage penetrating through the entire second conductor along the central axis of the second opening, and wherein the third conductor is configured to be movable in the passage in which the first electrical contact is embedded.

5. The cable module according to claim 1, wherein a central axis of the first opening is perpendicular to the central axis of the second opening.

6. The cable module according to claim 1, wherein the outer contour of the first conductor does not exceed an area delimited by the contour of the first opening on a cross section perpendicular to the central axis of the first opening.

7. The cable module according to claim 1, wherein the cable module further comprises a first cover integrated with a high-voltage detection sensor and fixed to a second flange of the enclosure around the second opening.

8. The cable module according to claim 1, wherein the enclosure is further provided with a third opening, and wherein the cable module further comprises a second cover integrated with an explosion-proof membrane and fixed to a third flange of the enclosure around the third opening.

9. A high voltage gas-insulated device comprising the cable module with a detachable electric connection according to claim 1.

10. A method for manufacturing a cable module for a high voltage gas-insulated device with a detachable electric connection, comprising:
    providing an enclosure having a first opening and a second opening;
    providing an insulator having a conductive insert;
    providing a first conductor electrically connected to the conductive insert, and fixing the assembly of the insulator with the first conductor to a first flange of the enclosure around the first opening;
    providing a cable terminal connector having a first end and a second end;
    providing a second conductor electrically connected to the first end of the cable terminal connector, and passing the assembly of the cable terminal connector with the second conductor through a wall of the enclosure such that the first end is positioned inside the enclosure and the second end is positioned outside the enclosure to be connected to an external cable;
    providing a third conductor detachably and electrically connecting the first conductor to the second conductor, wherein the third conductor is configured to be movable relative to the enclosure substantially along a central axis of the second opening to be fixedly connected to or separated from the first conductor; and
    providing a fourth conductor fixedly connected to the first end of the cable terminal connector, and wherein the second conductor is configured to be movable relative to the fourth conductor along a direction perpendicular to the central axis of the second opening and is electrically connected to the fourth conductor through a second electrical contact embedded in the fourth conductor.

11. The method according to claim 10, wherein the third conductor is detachably connected to the first conductor through a bolt, and wherein a central axis of the bolt coincides with the central axis of the second opening.

12. The method according to claim 11, wherein the connection or separation of the first conductor with the third conductor is implemented by inserting a tool through the second opening into the enclosure along the central axis of the second opening.

13. The method according to claim 10, wherein the third conductor is configured to be movable relative to the second conductor along the central axis of the second opening and is electrically connected to the second conductor through a first electrical contact embedded in the second conductor.

* * * * *